(12) United States Patent
Rotole et al.

(10) Patent No.: US 11,248,688 B2
(45) Date of Patent: Feb. 15, 2022

(54) ROLL GAP ADJUST MECHANISM

(71) Applicant: Deere & Company, Moline, IL (US)

(72) Inventors: David V. Rotole, Bloomfield, IA (US); Ethan C. Conrad, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/015,999

(22) Filed: Sep. 9, 2020

(65) Prior Publication Data

US 2020/0408286 A1    Dec. 31, 2020

Related U.S. Application Data

(62) Division of application No. 15/963,611, filed on Apr. 26, 2018, now Pat. No. 10,801,592.

(60) Provisional application No. 62/597,239, filed on Dec. 11, 2017, provisional application No. 62/505,602, filed on May 12, 2017.

(51) Int. Cl.
| | | |
|---|---|---|
| *F16H 21/54* | (2006.01) | |
| *A01D 43/00* | (2006.01) | |
| *A01D 43/10* | (2006.01) | |
| *A01D 101/00* | (2006.01) | |
| *F16H 37/12* | (2006.01) | |

(52) U.S. Cl.
CPC ........... *F16H 21/54* (2013.01); *A01D 43/006* (2013.01); *A01D 43/10* (2013.01); *A01D 2101/00* (2013.01); *F16H 37/12* (2013.01)

(58) Field of Classification Search
CPC ....... F16H 21/54; F16H 37/12; A01D 43/006; A01D 43/10; A01D 2101/00; A01D 82/00; B02C 4/32; B02C 4/02; Y10S 56/01; B65H 27/00; B65H 2404/1118; B65H 2404/13162; B65H 2403/514
See application file for complete search history.

(56) References Cited

U.S. PATENT DOCUMENTS

| | | | |
|---|---|---|---|
| 2,712,282 A | * | 7/1955 | Koch .................... A01D 82/00 100/47 |
| 3,339,352 A | | 9/1967 | Burrough et al. |
| 3,402,533 A | | 9/1968 | Johnston et al. |
| 4,472,927 A | | 9/1984 | Vogt et al. |

(Continued)

FOREIGN PATENT DOCUMENTS

| | | |
|---|---|---|
| GB | 1229818 | 4/1971 |
| RU | 77560 U1 | 10/2008 |

(Continued)

OTHER PUBLICATIONS

Russian Search Report issued in Patent Application No. 2018117531, dated Sep. 23, 2021, in 2 pages.

*Primary Examiner* — Vinh Luong

(57) ABSTRACT

In accordance with an example embodiment, a mower-conditioner may include first and second conditioning rolls, at least one eccentric, and a linkage having a lever. The first and second conditioning rolls are spaced apart a distance. The at least one eccentric is coupled to the mower-conditioner. The lever is coupled between the eccentric assembly and the first conditioning roll. The rotation of the at least one eccentric about a pivot axis causes the first conditioning roll to move via the lever, which adjusts the distance between the first and second conditioning rolls.

14 Claims, 15 Drawing Sheets

(56) References Cited

U.S. PATENT DOCUMENTS

| | | | |
|---|---|---|---|
| 4,539,798 A | | 9/1985 | Klinner |
| 4,896,483 A | * | 1/1990 | O'Halloran ............ A01D 82/00 |
| | | | 241/289 |
| 5,033,257 A | | 7/1991 | Walters |
| 5,531,062 A | | 7/1996 | Pfrimmer |
| 5,630,313 A | | 5/1997 | Von Allworden et al. |
| 6,425,232 B1 | | 7/2002 | Desnijder et al. |
| 6,715,271 B2 | | 4/2004 | Mellin |
| 8,701,376 B2 | | 4/2014 | Laumeier |
| 2016/0264367 A1 | * | 9/2016 | Mizuguchi ............. B65H 1/266 |
| 2021/0092903 A1 | * | 4/2021 | Gross ................... A01D 43/107 |

FOREIGN PATENT DOCUMENTS

| | | | |
|---|---|---|---|
| SU | 1750722 A1 | 7/1992 | |
| WO | WO2012038787 | 3/2012 | |

\* cited by examiner

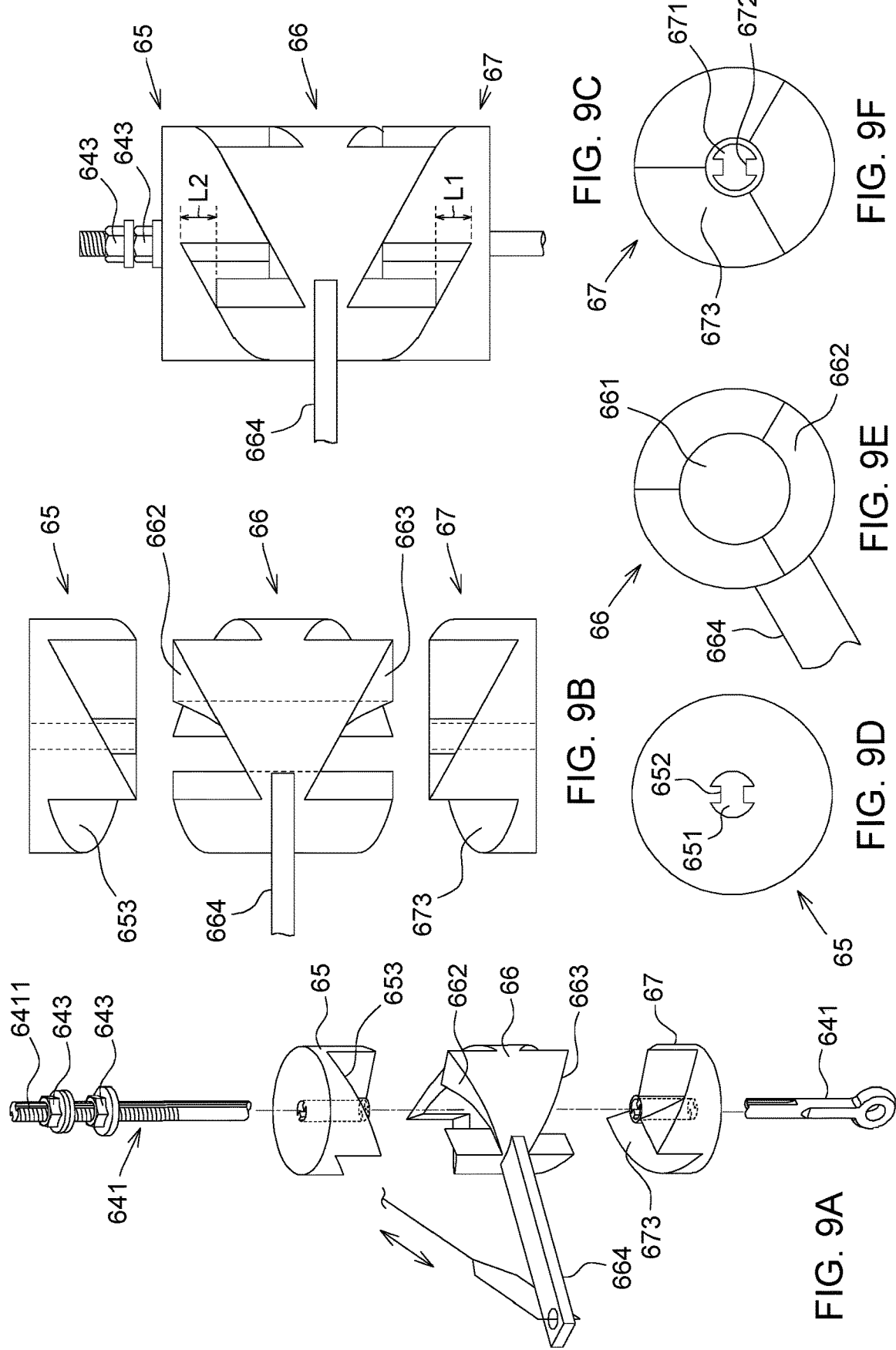

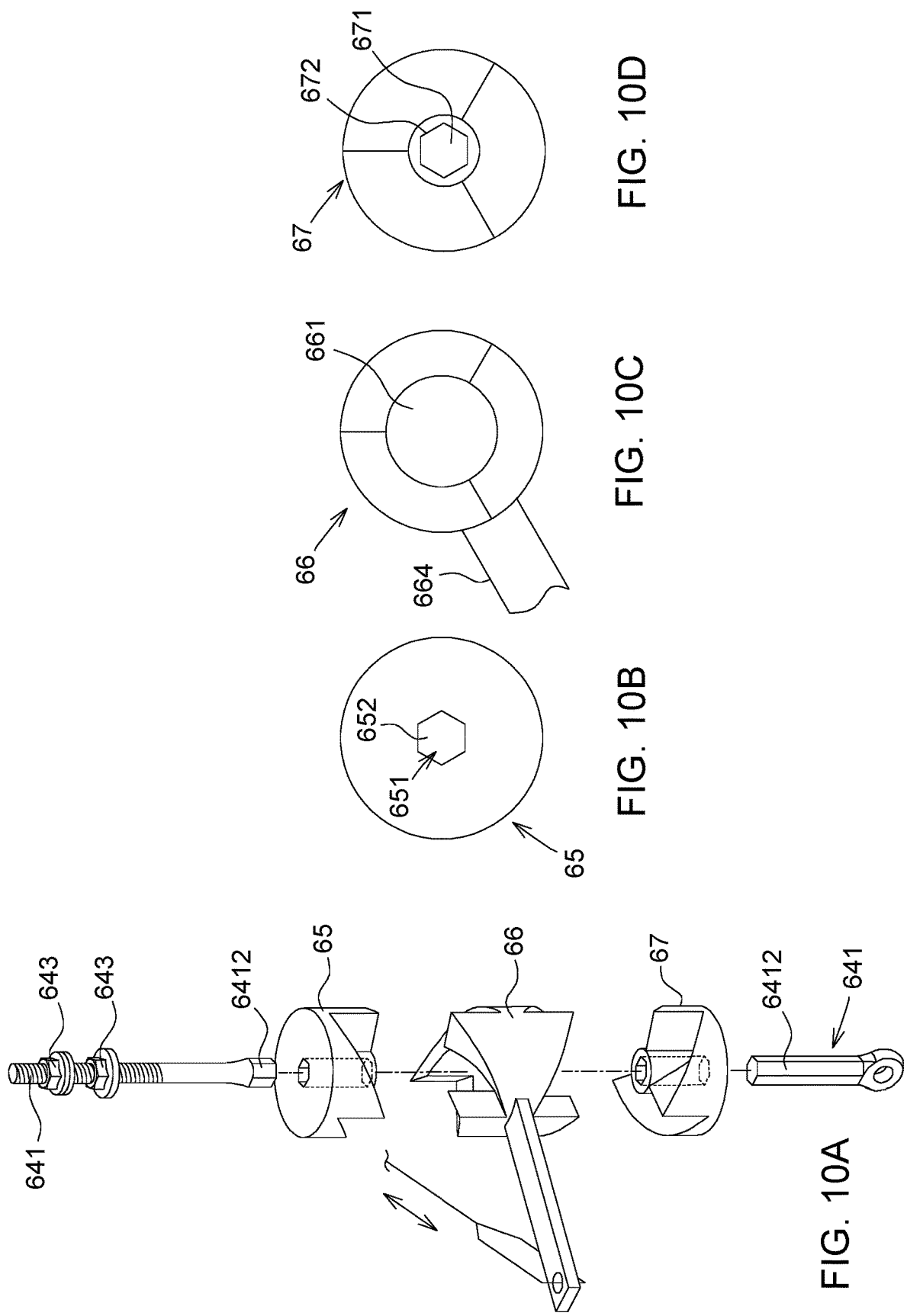

ROLL GAP ADJUST MECHANISM

RELATED APPLICATIONS

This is a divisional application of U.S. application Ser. No. 15/963,611, titled Roll Gap Adjust Mechanism, filed Apr. 26, 2018 which claims the benefit of U.S. provisional application No. 62/505,602, titled Roll Gap Adjust Mechanism, filed May 12, 2017, and U.S. provisional application No. 62/597,239, titled Roll Gap Adjust Mechanism filed Dec. 11, 2017, all of which are hereby incorporated by reference in their entirety.

FIELD OF THE DISCLOSURE

The present disclosure relates generally to agricultural equipment having crop conditioning rolls, and more particularly to a mechanism for adjusting a roll gap between conditioning rolls.

BACKGROUND OF THE DISCLOSURE

In the hay and forage industry among others, mower-conditioners, rotary platforms or heads, and draper platforms or heads include conditioning rolls which condition crop material after it is cut. The crop material is cut, then pressed or crushed between the conditioning rolls before being returned to the ground for drying. Conditioning, which crimps the stems and leaves, increases the loss of water in the crop material and further reduces the drying period. Once the crop material has sufficiently dried, the crop can be further processed or harvested by baling, combining, or chopping.

There are multiple factors such as the type of crops, type of rolls, weather, and terrain which influence the required conditioning level. One of the methods to change the conditioning level is to adjust a roll gap between the conditioning rolls. The smaller the roll gap, the more pressure is exerted on the crops. Currently, manual adjustment of the roll gap requires operators to stop their cutting or harvesting operations. However, this kind of adjustment is not efficient, especially for high frequency adjustments.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a mower-conditioner may include first and second conditioning rolls, at least one eccentric assembly, and a linkage. The first and second conditioning rolls are spaced apart a distance. The at least one eccentric assembly is coupled to the mower-conditioner. The linkage is coupled between the at least one eccentric assembly and the first conditioning roll. The movement of the at least one eccentric assembly causes the first conditioning roll to move via the linkage, which adjusts the distance between the first and second conditioning rolls.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 9A is a perspective exploded view of an adjustment assembly having a plurality of members with helical surfaces engaging with one another;

FIG. 9B is a side exploded view of the adjustment assembly of FIG. 9A;

FIG. 9C is a partial cutaway side view of interactions between the members of FIG. 9A;

FIG. 9D is a top view of a first member of FIG. 9A;

FIG. 9E is a top view of a second member of FIG. 9A;

FIG. 9F is a top view of a third member of FIG. 9A;

FIG. 10A is a perspective exploded view of another embodiment of an adjustment assembly having a plurality of members with helical surfaces engaging with one another;

FIG. 10B is a top view of a first member of FIG. 10A;

FIG. 10C is a top view of a second member of FIG. 10A;

FIG. 10D is a top view of a third member of FIG. 10A;

DETAILED DESCRIPTION

Figure 1:
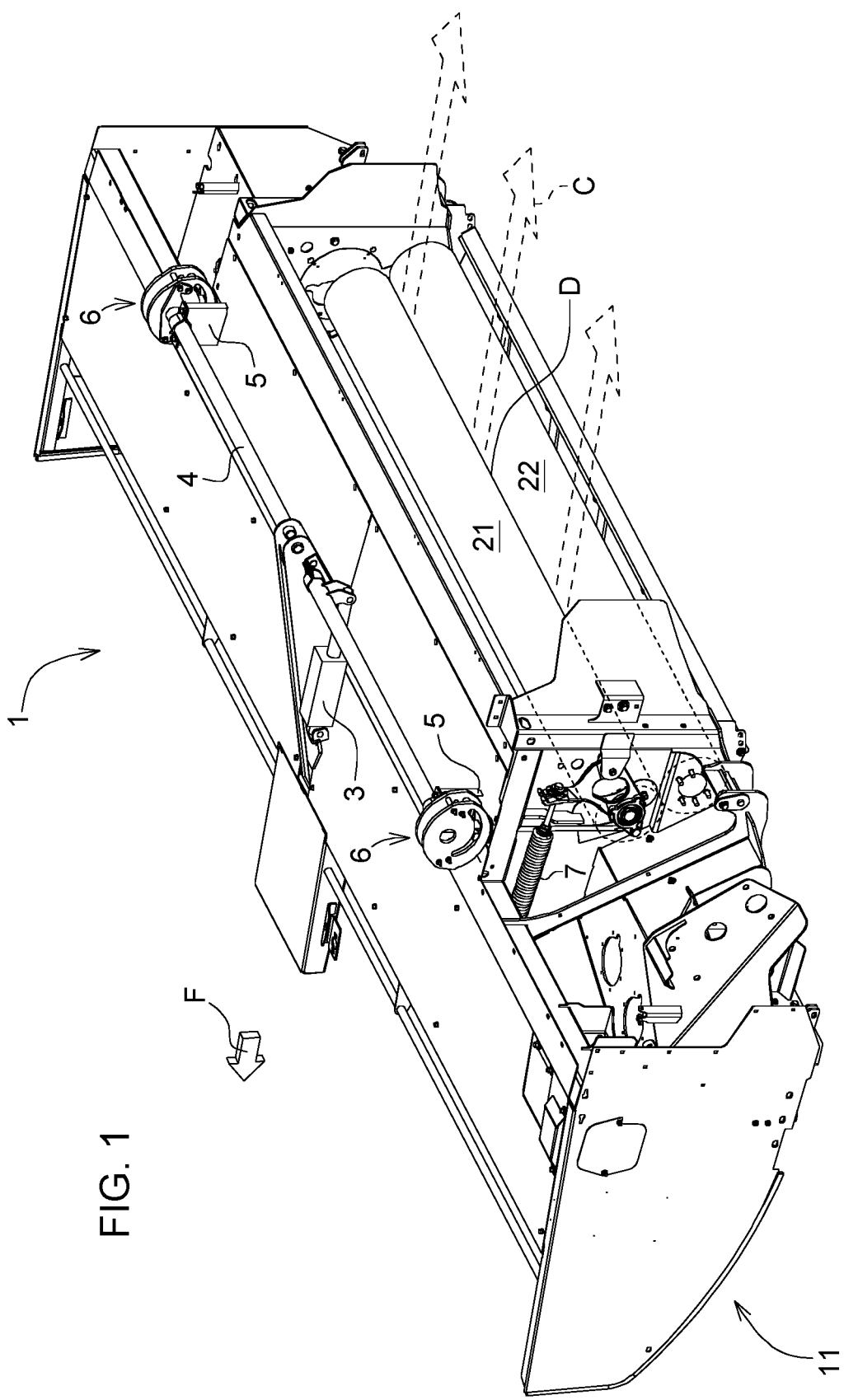
FIG. 1 is a rear perspective view of a mower-conditioner with eccentric assemblies coupled to the ends of a shaft and the ends of a conditioning roll.

This disclosure relates to the mower-conditioners, rotary platforms or heads, draper platforms and heads, and other crop cutting and conditioning equipment. Although the description is directed to mower-conditioners, the description is equally applicable to self-propelled windrower platforms or heads. The number and location of the mower-conditioners are not limited. For example, the mower-conditioner(s) can be pulled behind a vehicle such as truck or tractor. The mower-conditioner(s) can be positioned behind or beside the vehicle. Alternatively, the mower-conditioner(s) can operate in front of the vehicle.

This disclosure provides a solution for operators that they are not required to stop their current operation to manually adjust a roll gap between two rolls of the mower-conditioner. At least one of the conditioning rolls is configured to raise or lower to increase or decrease the roll gap between the rolls. To adjust the roll gap, an actuator, such as a linear actuator, may be coupled to an eccentric. The extension and contraction of the actuator can cause the eccentric to rotate. The eccentric is coupled to one of the conditioning rolls so that the roll gap between the conditioning roll adjusts, increases or decreases, as the eccentric rotates.

This disclosure also includes an advantage of a relief or release mechanism to protect the eccentric and actuator from an impact to at least one of the rolls. When material, such as hardened soil, excessive plant material, or a rock passes between the rolls, at least one of the rolls will suddenly move. The relief mechanism allows this movement or impact of the roll to bypass the eccentric.

These and other aspects and advantages of the disclosure will become apparent from the following description of the drawings. The embodiments disclosed in the drawings and the description are not intended to be exhaustive or to limit the disclosure to these embodiments. Rather, there are several variations and modifications which may be made without departing from the scope of the present disclosure.

With reference to FIG. 1, a mower-conditioner 1 comprises a frame 11, two conditioning rolls 21, 22, an actuator 3, a shaft 4, two shaft supporting elements 5, two eccentric assemblies 6 and resilient units 7. The two conditioning rolls 21, 22 are rotatably coupled to the frame 11, adjacent to the opening exit and positioned generally parallel for conditioning the crops. The crop flow is shown as arrow C. The first and second conditioning rolls 21, 22 are spaced apart a distance D.

The two supporting elements 5 are coupled to the upper portion of the frame 11. In this embodiment, the shaft supporting elements 5 are adjacent to the eccentric assemblies 6 which are located at the edges of the frame 11 in a lateral direction. The shaft supporting elements 5 are used to support the weight and maintain the position of the shaft 4. In this embodiment, the shaft supporting elements 5 are sheet metal mounts. Alternatively, the shaft supporting elements 5 may comprise a bearing (not shown) surrounding a portion of the shaft 4 allowing the shaft to rotate more easily.

Figure 2:
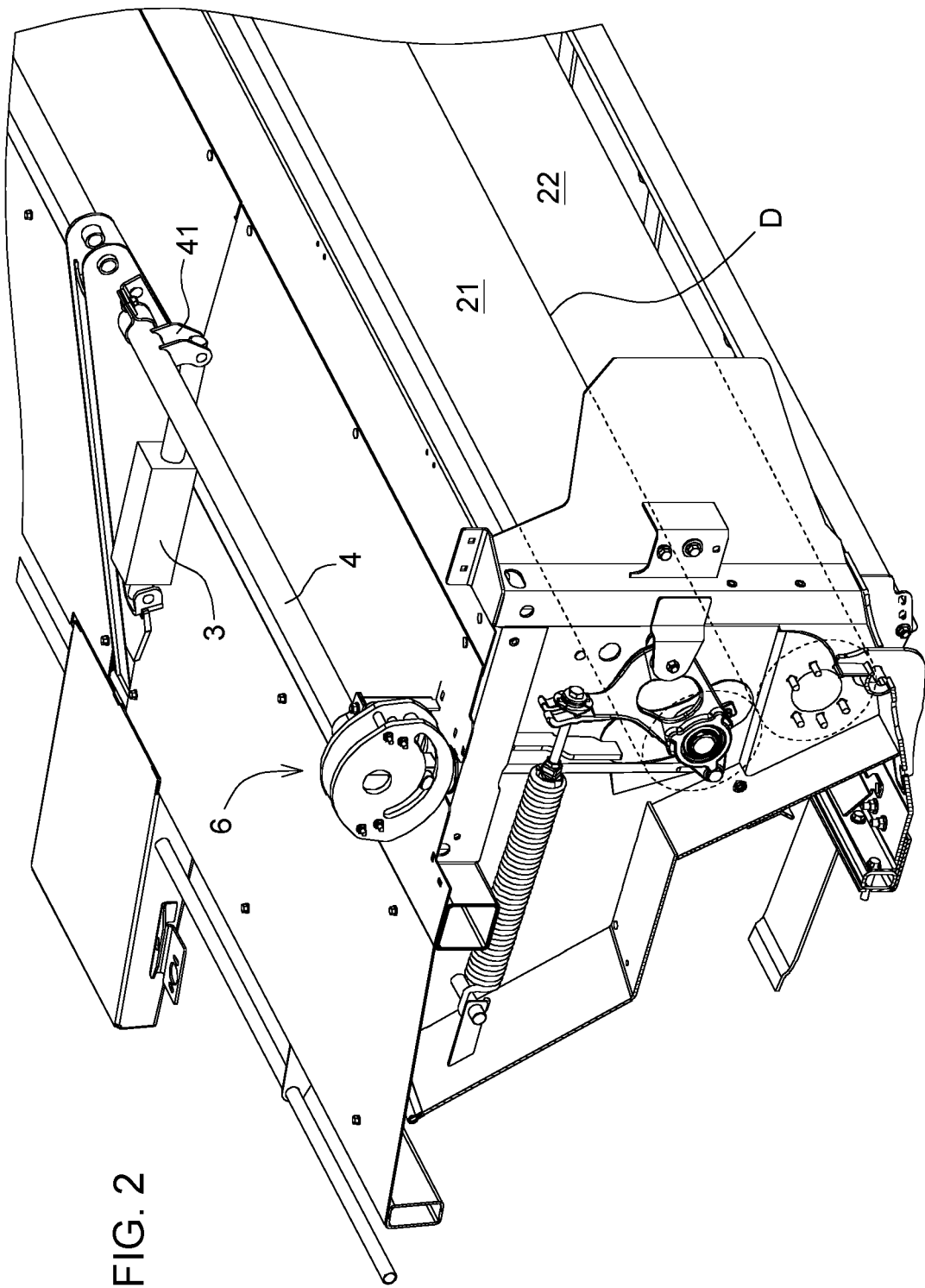
FIG. 2 is a partial rear perspective view of the mower-conditioner of FIG. 1.

With reference to FIG. 2. One end of the actuator 3 is coupled to the frame 11 and the other end of the actuator 3 coupled to a shaft 4 via a connecting element 41. The connecting element 41 in this embodiment comprises two generally parallel portions fixed on the shaft 4 by welding or other means. A portion of the actuator 3 is between the parallel portions and pivotally coupled to them. In this implementation, the actuator is configured to rotate the shaft via contraction and extension.

Figure 3:
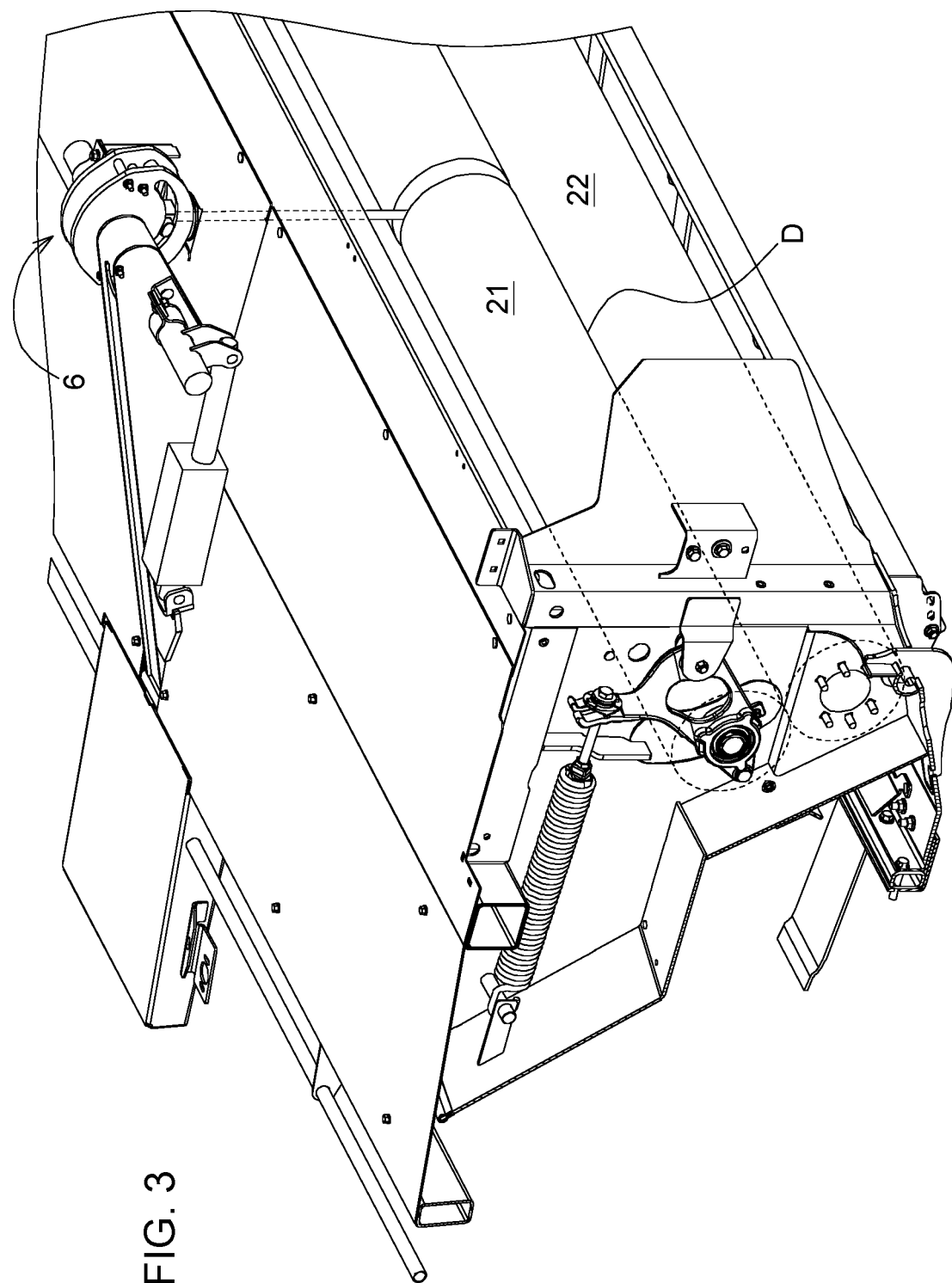
FIG. 3 is a partial view of another embodiment of a mower-conditioner with an eccentric assembly coupled to a shaft and a middle portion of a conditioning roll.

As described above, there are two eccentric assemblies 6, each of which respectively coupled to one of the ends of the shaft 4 in this embodiment. However, the number of eccentric assemblies 6 can vary from at least one and can be positioned anywhere along the width of the frame 11. For example, FIG. 3 depicts another embodiment of a mower-conditioner 1 with one eccentric assembly 6 coupled to a portion of a shaft 4 and coupled to the middle of the conditioning roll 21 in the lateral direction. The conditioning roll 21 has two segments separated in the middle of the roll. Between the segments there is a shaft (not shown) concentric to the rotation axis of the conditioning roll 21. The eccentric assembly 6 is coupled to the shaft to change the roll gap.

Figure 4:
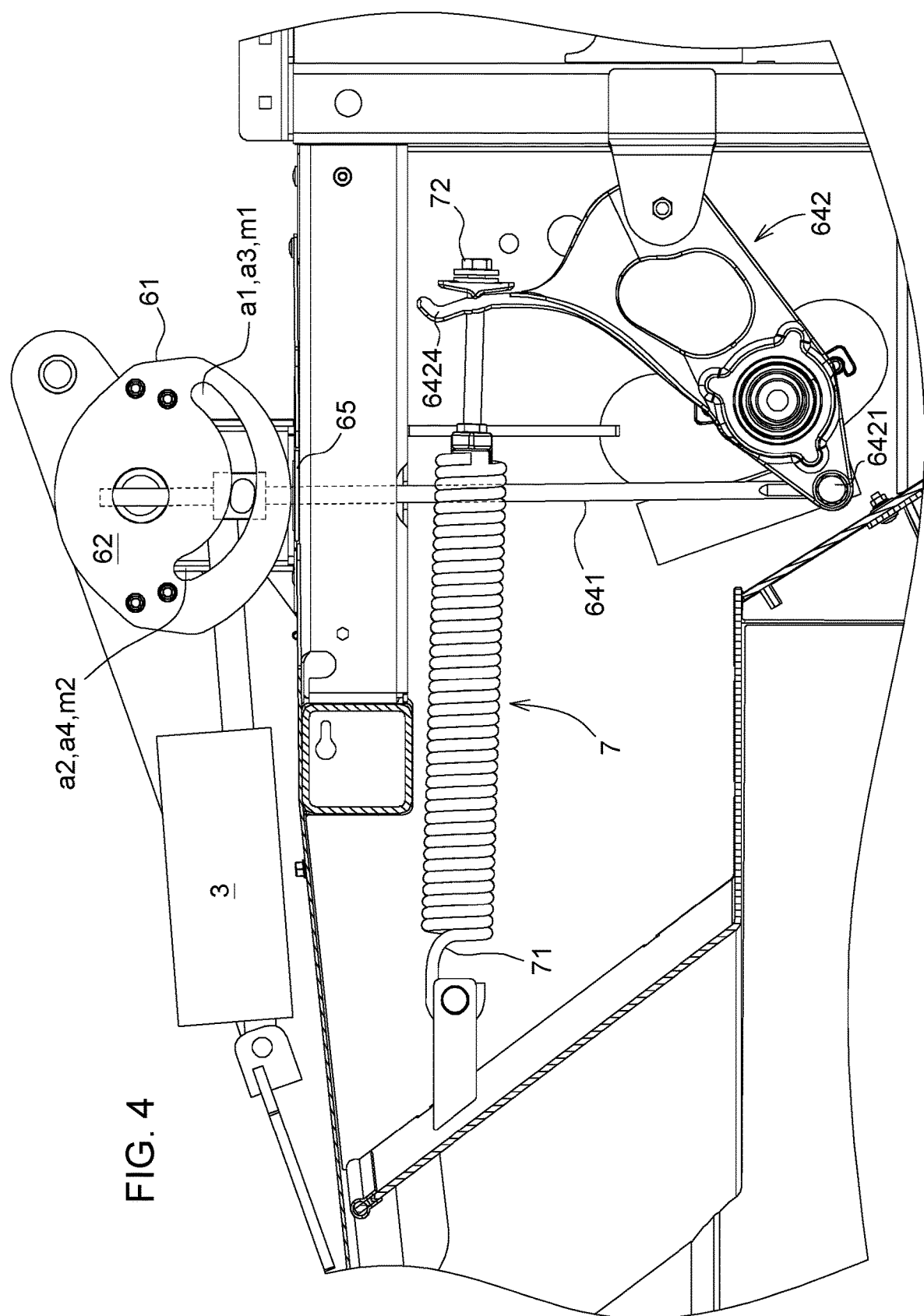
FIG. 4 is a partial left side view of the mower-conditioner of FIG. 1.
Figure 5:
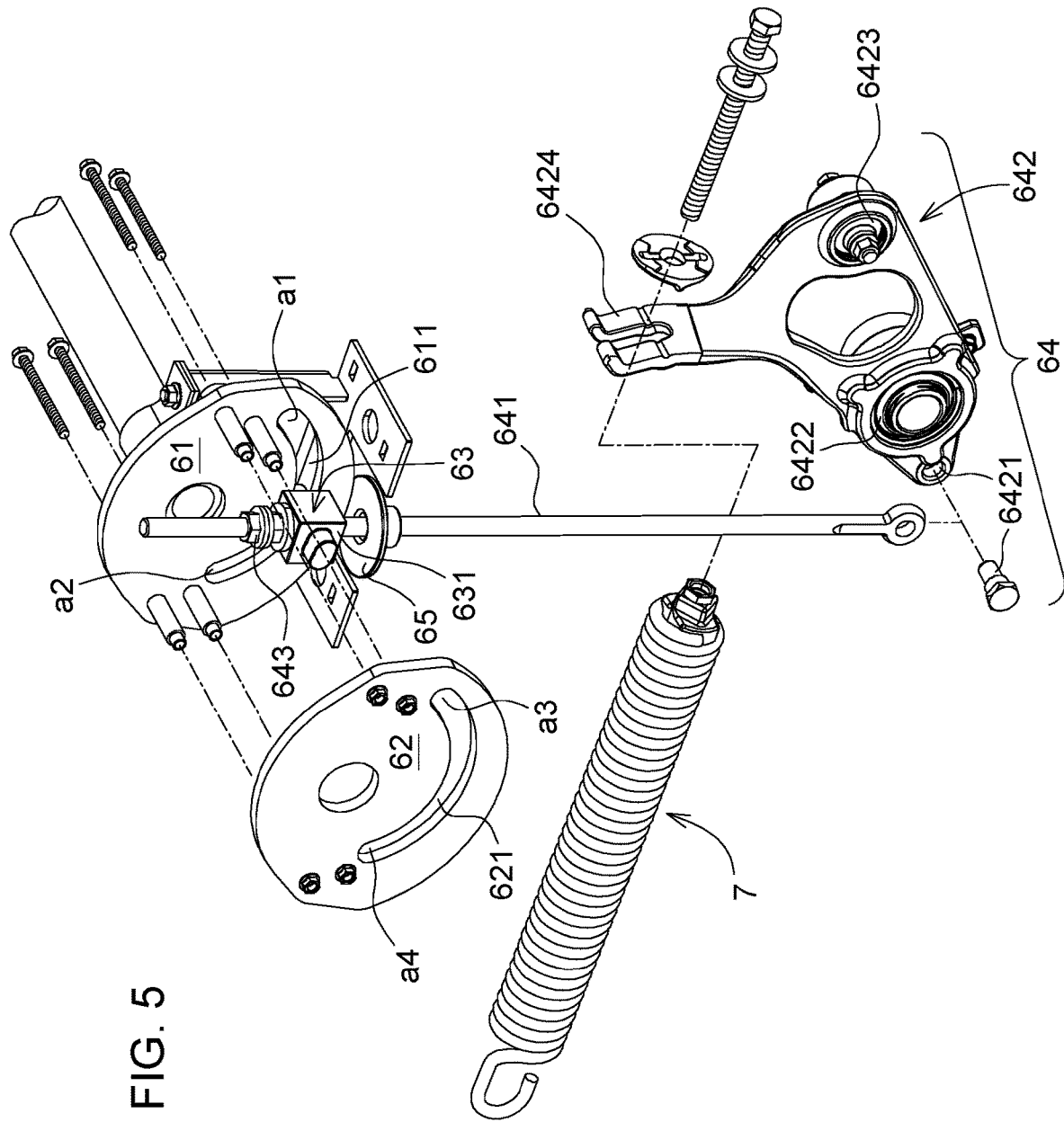
FIG. 5 is an exploded view of an eccentric assembly with a resilient unit.
Figure 6:
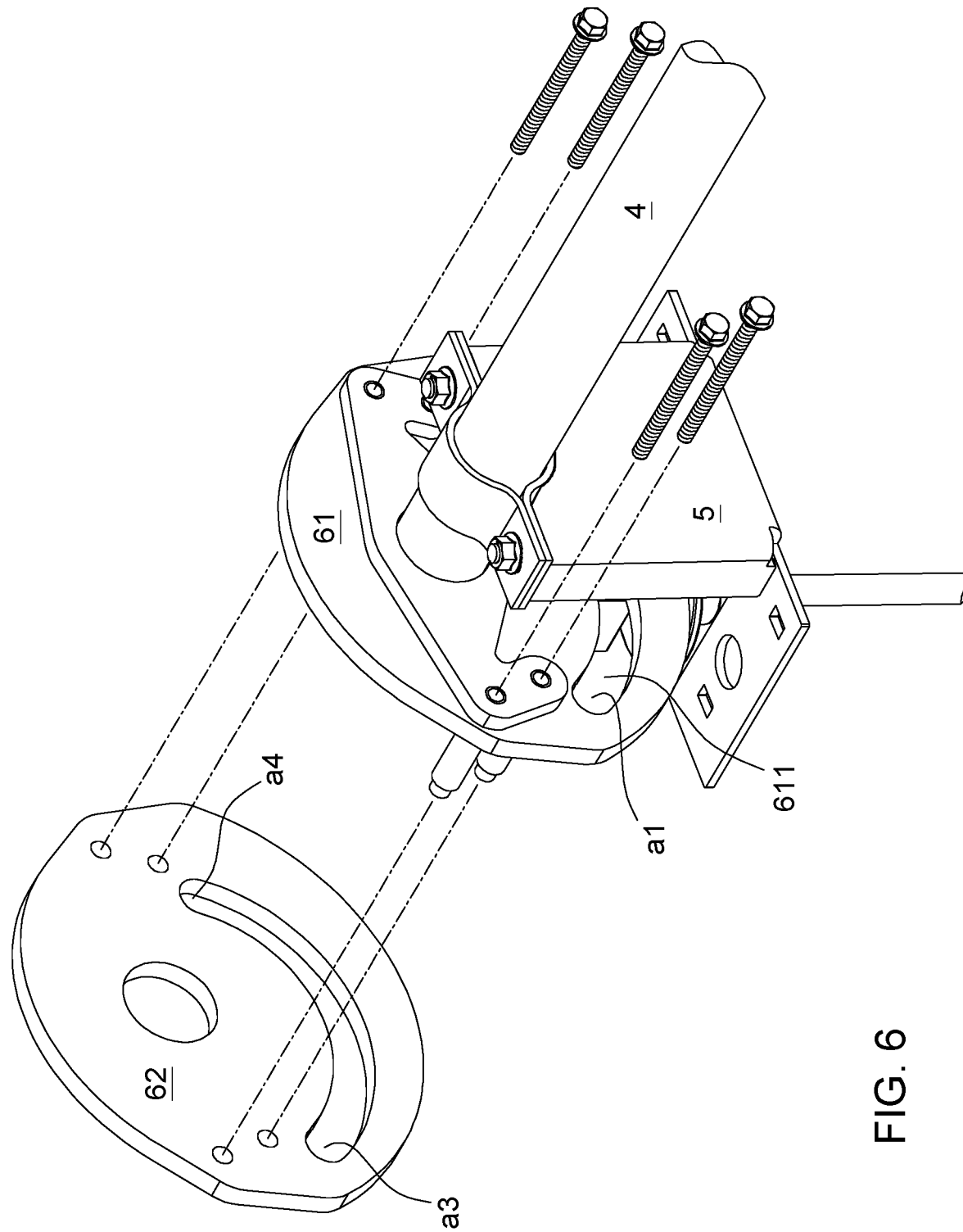
FIG. 6 is a partial exploded view of an eccentric assembly.

With reference to FIGS. 4-6, each of the eccentric assemblies may include a first eccentric 61, a second eccentric 62, a supporting member 63, and a linkage 64, according to this embodiment. Alternatively, the eccentric assembly may include a single eccentric. The first eccentric 61 and the second eccentric 62 can be coupled by one or more connecting tool, such as fasteners. The supporting member 63 can be located between the first eccentric 61 and the second eccentric 62.

The first eccentric 61 is coupled to the shaft 4 and comprises a first slot 611 positioned on the first eccentric 61. The first slot 611 in this embodiment is arcuate and has a first portion a1 and a second portion a2. One end of the supporting member 63 is slidable along the first slot 611 when the shaft 4 is rotated. The supporting member 63 has a first position m1 when the supporting member 63 is located at the first portion a1 of the first slot 611 and a second position m2 when the supporting member 63 is located at the second portion a2 of the first slot 611.

The second eccentric 62 is coupled to the shaft 4 and comprises a second slot 621 positioned on the second eccentric 62. The second slot 621 in this embodiment is arcuate and has a third portion a3 and a fourth portion a4. The third portion a3 is corresponding to the first portion a1 of the first eccentric 61; the fourth portion a4 is corresponding to the second portion a2 of the first eccentric 61. The other end of the supporting member 63 is slidable along the second slot 621 when the shaft 4 is rotated. The supporting member 63 has the first position m1 when the supporting member 63 is also located at the third portion a3 of the second slot 621 and the second position m2 when the supporting member 63 is also located at the fourth portion a4 of the second slot 621.

The linkage 64 is coupled to the supporting member 63 and to the conditioning roll 21. The linkage 64 is configured to move together with the supporting member 63 which results in the two conditioning rolls 21, 22 having a first roll gap when the supporting member 63 is in the first position m1 and a second roll gap when the supporting member is in the second position m2. Different implementations of the eccentric that change the roll gap in specific patterns will be discussed in reference to FIGS. 7A-7F, FIGS. 8A-8B.

The linkage 64 may be one element directly coupled the supporting member 63 and the conditioning roll 21 or multiple elements linking the supporting member 63 and conditioning roll 21. Referring to FIG. 5, the linkage 64 in this embodiment comprises a linear portion 641, lever 642, and a restraining member 643. The linkage 64 is at least partially positioned within an aperture 631 of the supporting member 63. The linear portion 641 is a rod configured to move within the aperture 631 in a first direction (partially downward) and in a second direction substantially opposite the first direction. The lever 642 includes a first connecting portion 6421, a roll carry portion 6422, a pivot portion 6423, and a second connecting portion 6424. The first connecting portion 6421 provides pivotal connection for the bottom of the linear portion 641. The roll carry portion 6422 is coupled to one end of the conditioning roll 21. The pivot portion 6423 is directly coupled to the frame 11 and the lever 642 is configured to rotate about the axis of the pivot portion 6423. The second connecting portion 6424 is coupled to the resilient unit 7. Referring again to FIG. 4, when the actuator 3 extends, the shaft 4, the first and second eccentrics 61, 62 rotate counter clockwise. The support member 63 and the linear portion 641 are moved upward and therefore the lever 642 rotates about the axis of pivot portion 6423 clockwise. The conditioning roll 21 is moved partially upward with the rotation of the lever 642. The roll gap is change in this regard. In addition, the resilient unit 7 is extended during the rotation of the lever 642.

Referring to FIGS. 5-6, the restraining member 643, as a threaded fastener in this embodiment, is coupled to the linear portion 641 of the linkage 64 and positioned above the supporting member. Due to the weight of the conditioning roll 21 and the linear portion 641, with other efforts, the restraining member 643 normally contacts a top portion of the supporting member 63. The linear portion 641 is also threaded; the restraining member 643 is therefore movable to adjust the roll gap independent of the first and second eccentrics 61, 62 via moving the linear portion 641. The restraining member 643 is used to restrict the movement of the linear portion 641 of the linkage 64 within the aperture 631 in a first direction (partially downward) and allows movement of the linear portion 641 within the aperture 631 in a second direction (partially upward) substantially opposite the first direction. In this regard, if there is an impact from the conditioning roll 21 moving partially upward, the linear portion 641 can move partially upward relative to the supporting member 63. Therefore, the impact bypasses the first and second eccentrics 61, 62, the shaft 4, and the actuator 3.

The resilient unit 7 is used for absorbing the impact mentioned above and accelerating the conditioning roll 21 to recover into a normal position after the impact. Referring to FIGS. 4 and 5, the resilient unit 7 in this embodiment is a spring. The resilient unit 7 comprises a curved portion 71 on one end coupling to the frame 11 and a bolt 72 on the other end coupling to the second connecting portion 6424 of the lever 642. When the sudden impact leads the lever 642 rotate clockwise, the second connecting portion 6424 of the lever 642 moves partially rightward, as depicted in FIG. 4. The resilient unit 7 is extended and therefore provides a resilient force partially leftward on the second connecting portion 6424.

Referring to FIGS. 4-5, the eccentric assembly 6 may further include a plate 65 coupled to the frame 11. The outer edges of the first and second eccentrics 61, 62 rotatably contact the top of the plate 65. Alternatively, the plate 65 can be omitted or resting in the space.

FIGS. 7A-7F, 8A-8B provides multiple examples of the configuration of the eccentric. It is noted that the third portion a3 and the fourth portion a4 are used to represent different portions of the second slot 621; the third portion a3 and the fourth portion a4 can be any portions, included but not limited to the ends of the second slot 621. Any of these features can be applied to the first eccentric 61, the second eccentric 62, or both.

Figure 7B:
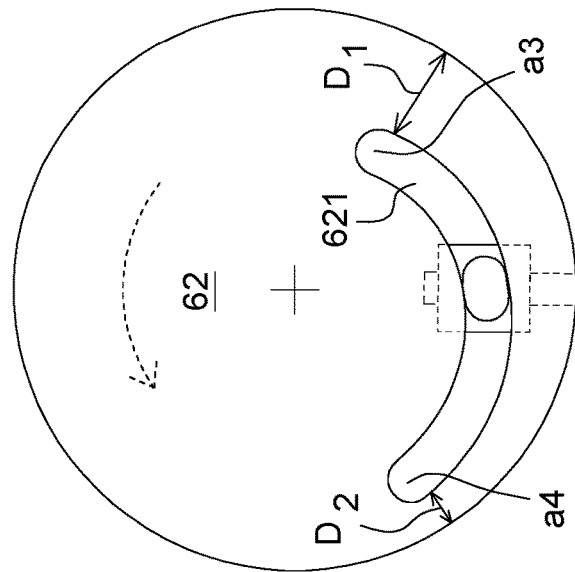
FIG. 7B is side view of another embodiment of an eccentric rotating counter clockwise, with distance between the eccentric slot and the edge decreasing gradually.
Figure 7D:
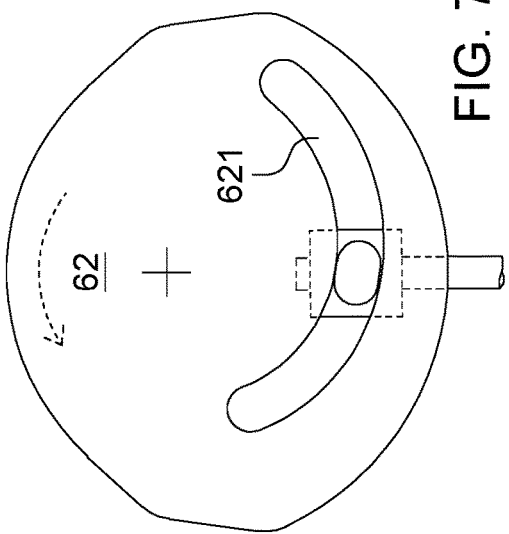
FIG. 7D is side view of another embodiment of eccentric rotating counter clockwise.
Figure 7A:
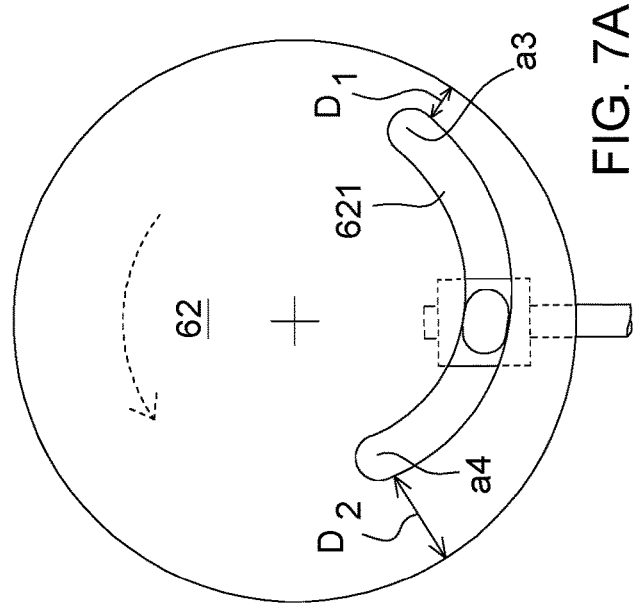
FIG. 7A is side view of an eccentric rotating counter clockwise, with distance between the eccentric slot and the edge increasing gradually.

FIG. 7A is a side view of an eccentric rotating counter clockwise, with distance between the eccentric slot and the edge increasing gradually. The second slot 621 is positioned eccentrically on the second eccentric 62. The second radial distance (D2) between the fourth portion a4 of the second slot 621 and an outer edge of the second eccentric is greater than the first radial distance (D1) between the third portion of the second slot 621 and the outer edge of the second eccentric. The distance of the supporting member 63 moving upward when it moves from the third portion a3 to the fourth portion a4 is calculated the deference between D2 and D1. (D2 minus D1.) The roll gap is therefore increased.

It is noted that even if the shaft 4 rotated in the same direction, when the eccentric is structured differently, the supporting member 63 will be moved differently based upon the eccentric. FIG. 7B is side view of another embodiment of eccentric rotating counter clockwise, with distance between the eccentric slot and the edge decreasing gradually. The second radial distance (D2) between the fourth portion a4 of the second slot 621 and an outer edge of the second eccentric is smaller than the first radial distance (D1) between the third portion of the second slot 621 and the outer edge of the second eccentric. The distance of the supporting member 63 moving downward when it moves from the third portion a3 to the fourth portion a4 is calculated the deference between D1 and D2. (D1 minus D2.) The roll gap is therefore decreased.

Figure 7C:
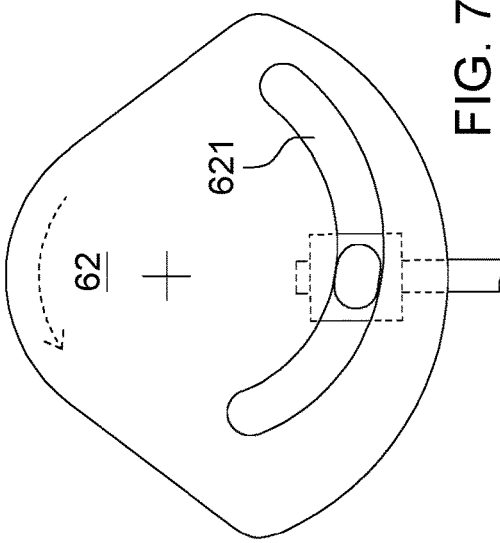
FIG. 7C is side view of another embodiment of an eccentric rotating counter clockwise.

FIG. 7C is side view of another embodiment of eccentric rotating counter clockwise, with a different shape; FIG. 7D is side view of another embodiment of eccentric rotating counter clockwise, with a different shape. It is noted that either the eccentric second slot 621 in FIG. 7A or 7B can be applied to FIGS. 7C, 7D.

It is noted that the slot is not always required to be an eccentric arcuate slot; it can be structured as linear slot or comprise multiple arcuate segments.

Figure 7E:
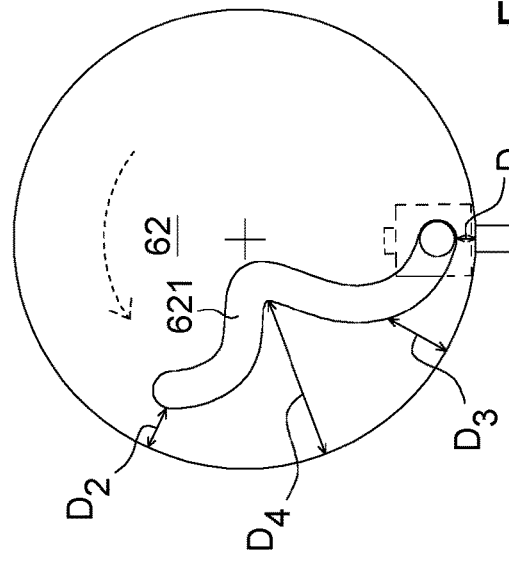
FIG. 7E is side view of another embodiment of eccentric rotating counter clockwise.

FIG. 7E is side view of another embodiment of eccentric rotating counter clockwise, with a linear slot. The support member 63 will move downward quickly and so does the roll 21 that is coupled to the linkage 64. The roll gap is decreased quickly as well.

Figure 7F:
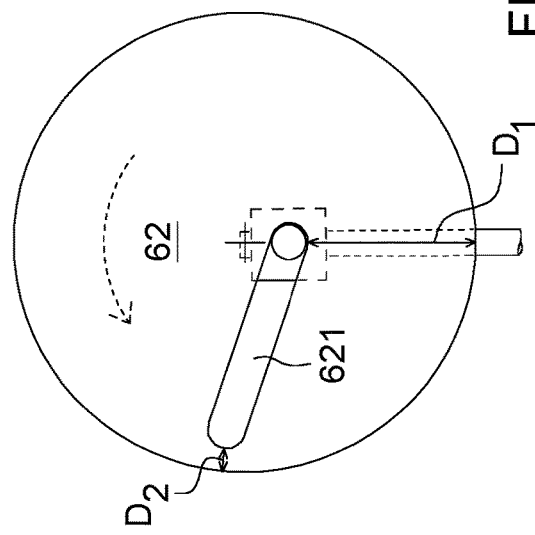
FIG. 7F is side view of another embodiment of eccentric rotating counter clockwise.

FIG. 7F is side view of another embodiment of eccentric rotating counter clockwise, with a customized slot. The customized slot includes multiple arcuate segment and therefore have multiple radial distances D1-D4. The roll gap will increase and decrease during the rotation of the second eccentric 62 depending on the structure of the second slot 621.

Figure 8A:
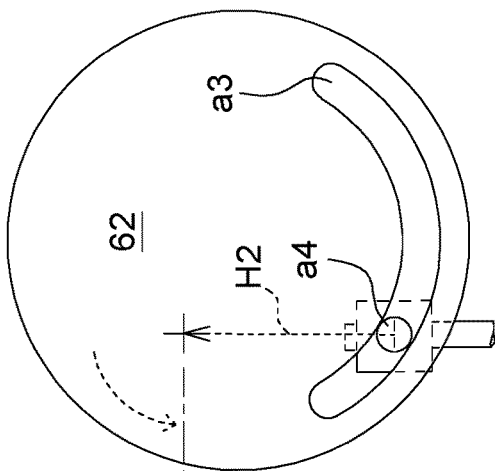
FIG. 8A is side view of another embodiment of an eccentric with the rotating axis off center and a supporting member positioned in one end of an arcuate slot.
Figure 8B:
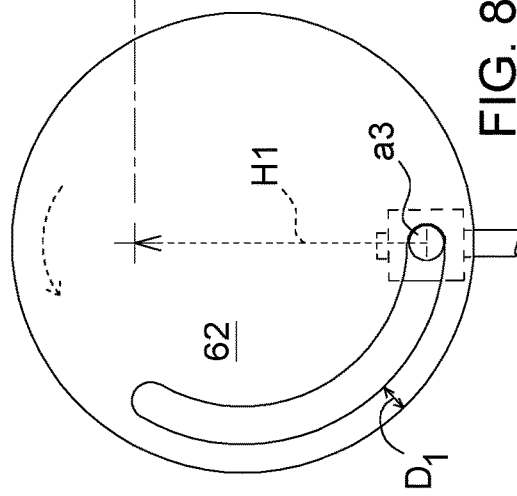
FIG. 8B illustrates the embodiment of the eccentric of FIG. 8A when the supporting member slides to another portion of the arcuate slot.

It is feasible that the slot of an eccentric is concentric to the eccentric. FIG. 8A is side view of another embodiment of eccentric, the rotating axis is off center, the supporting member is positioned in one end of an arcuate slot. FIG. 8B demonstrates the embodiment of eccentric in FIG. 8A when the supporting member slides to another portion of the arcuate slot. In FIG. 8A, the support member 63 is located in the third portion a3 of the second eccentric 62. The distance between the support member 63 and the axis of the second eccentric 62 is denoted by H1. In FIG. 8B, the support member 63 is located in the fourth portion a4 of the second eccentric 62. The distance between the support member 63 and the axis of the second eccentric 62 is denoted by H2. The distance of the supporting member 63 moving upward when it moves from the third portion a3 to the fourth portion a4 is calculated the deference between H1 and H2. (H1 minus H2.) The roll gap is therefore increased.

The above describes example embodiment of the present disclosure. Other types of eccentrics, such as eccentric slot with the rotation axis is off center is not depart from the scope of the present disclosure.

The present disclosure further includes a method of adjust a roll gap between two conditioning rolls in a mower-conditioner.

Step 1: Change an amount of linear extension of an actuator. The actuator is coupled to a shaft.

Step 2: Rotate the shaft and a first eccentric of at least one eccentric assembly coupled to the shaft by changing the amount of the linear extension of the actuator into a degree of a rotation of the first eccentric. Optionally, Step 2 also includes rotating a second eccentric of the at least one eccentric assembly coupled to the shaft.

Step 3: Moves a supporting member within a first slot of the first eccentric during the rotation of the first eccentric.

Step 4: Moves one of the two rolls coupled to a linkage to adjust the roll gap between the two rolls based upon the movement of the supporting member within the first slot of the first eccentric.

Step 5: Moves a restraining member to adjust the roll gap between the rolls independent of the eccentric.

Referring to FIGS. 9A-9F, another embodiment of an eccentric assembly is depicted. FIG. 9A illustrates a perspective exploded view of an adjustment assembly 6, which includes three members, or eccentrics: a first member 65, a second member 66, and a third member 67. In other embodiments, as shown in FIGS. 11A-B and 12A-B, the adjustment assembly 6 may include two members: a first member 68 and a second member 69. A linkage 64 may include one element (linear portion 641) directly coupled to the adjustment assembly 6 and the roll or multiple elements linking the adjustment assembly 6 and roll. The first, second, and third members 65, 66, 67 have apertures 651, 661, 671 in the center such that the linear portion 641 is configured to move within the aperture 651, 661, 671 in a first direction (partially downward) and in a second direction substantially opposite the first direction. The bottom of the first member 65 includes three helical surfaces 653 facing toward three helical surfaces 662 of the second member 66; the top of the third member 67 includes three helical surfaces 673 facing toward three helical surfaces 663 of the second member 66. Referring to FIG. 9B, the helical surfaces 653 are corresponding to helical surface 662; and the helical surfaces 663 are corresponding to the helical surface 673. In this embodiment, the third member 67 is fixed to the frame 11 (not shown) and therefore there is no substantial rotation and vertical movement relative to the frame. The second member 66 has a connecting arm 664 coupled to an actuator (not shown). The actuator is configured to extend and contract to rotate the second member 66. In other embodiments, the members may include a single helical surface or two or more helical surfaces.

Referring to FIG. 9A, 9D-9F, the aperture 661 of the second member 66 has a wider diameter than that of the linear portion 641, such that the rotation of the second member 66 is not influenced by the linear portion 641. On the contrary, both the first and third members 65, 67 have locking mechanisms interacting with the linear portion 641. The linear portion 641 includes a pair of locking channels 6411 positioned opposite to each other as shown in FIG. 9A. The first member 65 includes a pair of locking edges 652 protruding from the edge of the aperture 651 and positioned opposite to each other. The third member 67 includes a pair of locking edges 672 protruding from the edge of the aperture 671. Because the third member 67 is fixed on the frame 11 and the locking edges 672 are engaged with the locking channels 6411 of the linear portion 641, the locking edges 672 restrain the linear portion 641 from rotating about a vertical axis. Because the rotation of the linear portion 641 is restrained and the locking edges 652 of the first member 65 are engaged with the locking channels 6411 of the linear portion 641, the rotation about the vertical axis of the first member 65 is further restrained. Also, because the connecting portion (not shown but similar to the first connecting portion 6421 shown in FIGS. 4 and 5) is coupled to the bottom of the linear portion 641, the rotation about the vertical axis of the linear portion 641 is further restrained. Alternatively, the linear portion 641 can directly be coupled to one of the conditioning rolls to lift it without the connecting portion of the lever.

In the initial status of the first, second, and third members 65, 66, 67, the entire helical surfaces 653 substantially contact the entire helical surfaces 662; the entire helical surfaces 663 substantially contact the entire helical surfaces 673. In this regard, a height between the top of the first member 65 and bottom of the third member 67 maintain its minimum and the roll gap is not changed.

Referring to FIG. 9C, when the second member 66 is moved by the actuator, directly or indirectly, to rotate clockwise, the helical surfaces 663 slide partially left from the helical surface 673 of the third member 67. Due to the reaction from the third member 67 which is fixed on the frame 11, the second member 66 is moved upward in a distance denoted by L1. At the same time, since the first member 65 does not substantially rotate, the helical surfaces 662 slide partially left from the helical surface 653 of the first member 65. Due to the reaction from the second member 66, the first member 65 is moved upward in a distance denoted by L2. In this regard, the change in height between the top of the first member 65 and bottom of the third member 67 is L1 plus L2. With the restraining member(s) 643 coupled on the threaded linear portion 641 and positioned on the top of the first member 65, the vertical movement of the linear portion 641 caused by the actuator is also L1 plus L2. Accordingly, the conditioning roll 21 or 22, at least one side, is moved upward in a distance equal to L1 plus L2.

The restraining member 643 restricts movement of the linear portion 641 in a first direction (e.g., downward), setting a minimum distance between the first and second conditioning rolls 21, 22, and allows movement of the linear portion 641 in a second direction (e.g., upward), allowing the distance between the first and second conditioning rolls 21, 22 to increase based upon material passing between the conditioning rolls 21, 22.

Referring to FIGS. 10A-10D, another embodiment of an eccentric assembly is depicted. One of the differences between this embodiment and that of FIGS. 9A-9F is the configurations of the linear portion 641 and the apertures 651, 671. In this embodiment, the body of the linear portion 641 is polygonal (e.g., hexagonal) with multiple (e.g., six) locking edges 6412. The apertures 651, 671 are also polygonal, with the same number of locking edges 652, 672 in order to engage with the linear portion 641. Because the third member 67 is fixed on the frame 11 and the locking edges 672 are engaged with the locking edges 6412 of the linear portion 641, the locking edges 672 restrain the linear portion 641 from rotating about a vertical axis. Because the rotation of the linear portion 641 is restrained and the locking edges 652 of the first member 65 are engaged with the locking edges 6412 of the linear portion 641, the rotation about the vertical axis of the first member 65 is further restrained. Other features are similar to the embodiments presented in FIGS. 9A-9F.

Figure 11A:
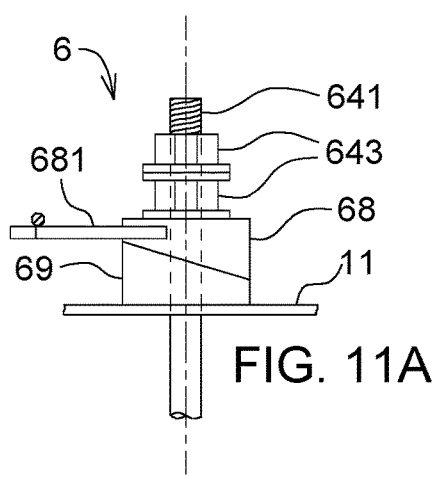
FIG. 11A is a side view of another embodiment of an adjustment assembly having a plurality of members with helical surfaces engaging with one another.
Figure 11B:
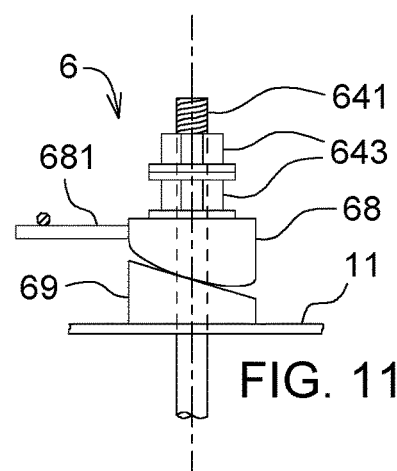
FIG. 11B is a side view of interactions among the members of FIG. 11A when one of the members rotates relative to the other member.

Referring to FIGS. 11A-11D, another embodiment of an eccentric assembly is depicted. The adjustment assembly 6 (eccentric assembly 6) in this embodiment includes two members—a first member 68 and a second member 69. The second member 69, similar to the third member 67 in the previous embodiment, is fixed on the frame 11. The first member 68 has a helical surface corresponding to that of the second member 69. In addition, the first member 68 has a first connecting arm 681 coupled to the actuator 3. The actuator 3 is configured to extend and contract to rotate the first member 68. The first member 68 includes an aperture (not shown) having a wider diameter than that of the linear portion 641 such that the rotation of the first member 68 is not influenced by the linear portion 641. FIG. 11A illustrates the initial status that the entire helical surface of the first member 68 substantially contacts the entire helical surface of the second member 69. After the actuator 3 moves the first member 68 via the first connecting arm 681 to rotate, as shown in FIG. 11B, the helical surface of the first member 68 and the helical surface of the second member 69 merely partially contact each other. Due to the reaction from the second member 69, the first member 68 is moved upward. With the restraining member 643 coupled on the threaded linear portion 641 and positioned on the top of the first member 68, the linear portion 641 is moved upward.

Figure 11C:
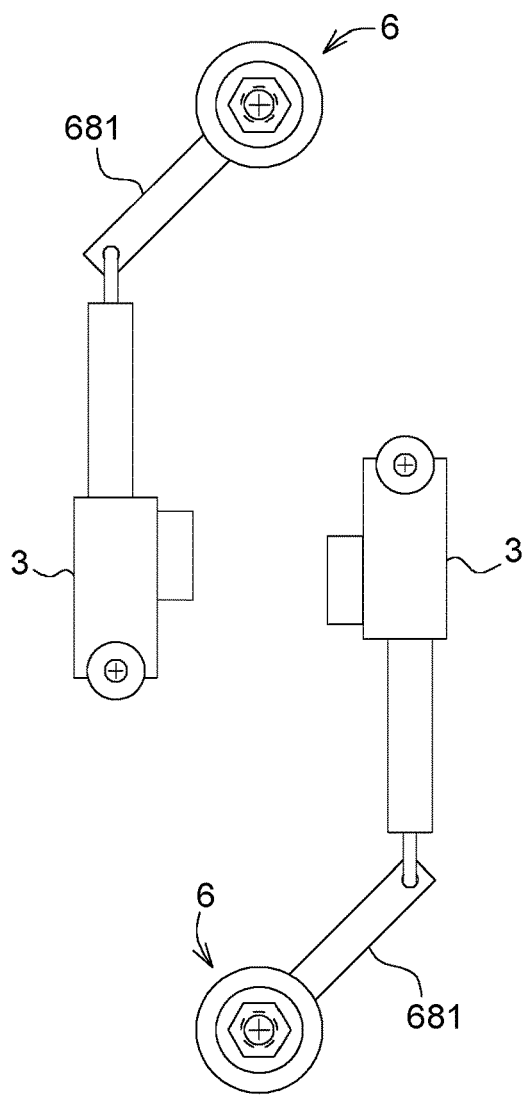
FIG. 11C is a top view of two adjustment assemblies of FIG. 11A, each of which coupled to an actuator.
Figure 11D:
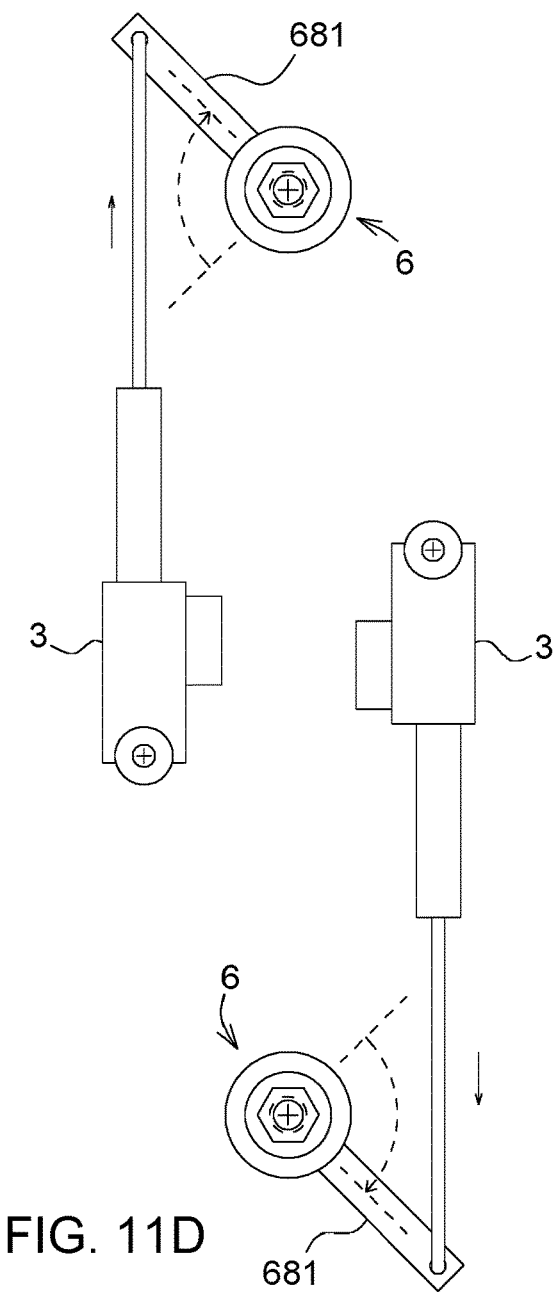
FIG. 11D is a top view of two adjustment assemblies of FIG. 11B, each of which coupled to an actuator.
Figure 12A:
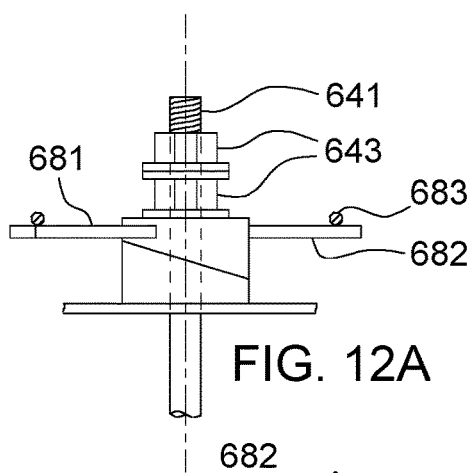
FIG. 12A is a side view of another embodiment of an adjustment assembly having a plurality of members with helical surfaces engaging with one another.
Figure 12B:
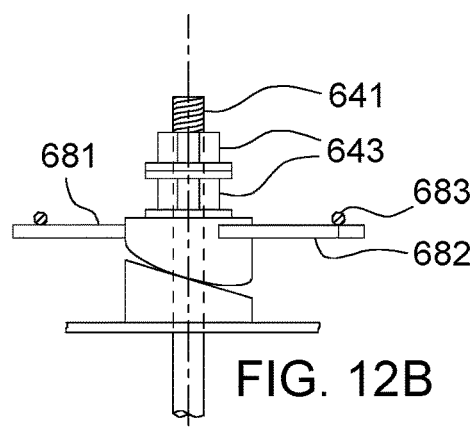
FIG. 12B is a side view of interactions among the members of FIG. 12A when one of the members rotates relative to the other member.
Figure 12C:
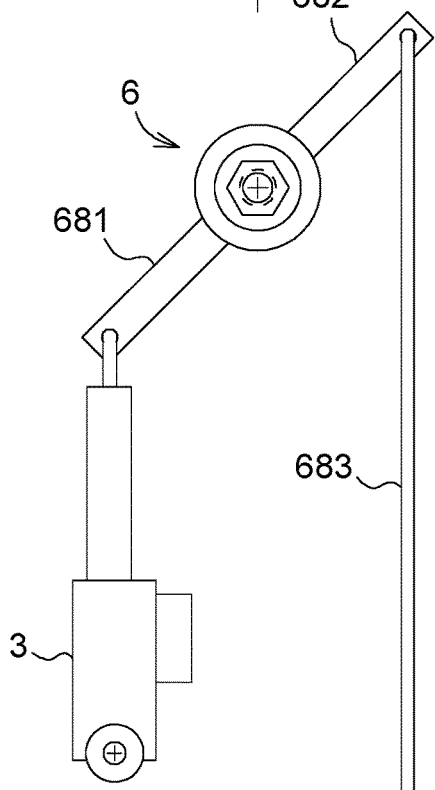
FIG. 12C is a top view of two adjustment assemblies of FIG. 12A, with the two adjustment assemblies coupled with each other, and one of the adjustment assemblies coupled to an actuator.
Figure 12D:
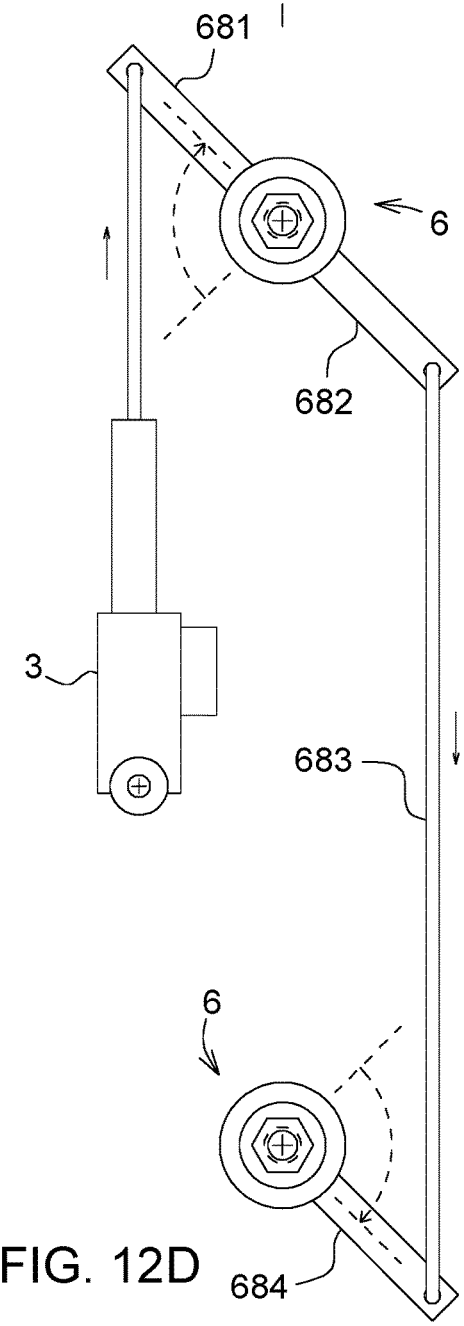
FIG. 12D is a top view of two adjustment assemblies of FIG. 12B, with the two adjustment assemblies coupled with each other, and one of the adjustment assemblies coupled to an actuator.

FIG. 11C illustrates two adjustment assemblies 6 in the initial status as shown in FIG. 11A. Each of the adjustment assemblies 6 can operate independently from one another by coupling to an actuator 3. The adjustment assemblies 6 are coupled to two ends of rolls (such as conditioning roll 21 or 22 in FIG. 1). After the two actuators 3 extend to move the first members 68 of the two adjustment assemblies 6 to rotate clockwise, as shown in FIG. 11D, the first members 68 of the two adjustment assemblies 6 are moved upward and therefore the roll gap between the conditioning rolls 21, 22 is changed.

Referring to FIG. 12A-12D, another embodiment of an eccentric assembly is depicted. In this embodiment, one actuator 3 can simultaneously operate both adjustment assemblies 6. One of the first member 68 of the adjustment assemblies 6 has a first connecting arm 681 coupled to the actuator 3 and a second connecting arm 682 coupled to one end of a linkage 683. The other first member 68 of the adjustment assemblies 6 has a third connecting arm 684 coupled to the other end of the linkage 683. In this regard, when the actuator 3 extends or contracts, both of the first member 68 rotate to lift or drop the ends of a roll to adjust the roll gap (the distance between the conditioning rolls).

In the embodiments of FIGS. 11A-11D, 12A-12D, the second (lower helical) member is fixed on the frame and the first (upper helical) member is moved without a locking edge engaging with the linear portion 641. Alternative the second (lower helical) member has locking mechanism such as locking edges engaging with the linear portion without being fixed on the frame to retain its position.

Alternatively, the lower helical member is not required to be fixed on the frame and can also be moved. If the upper helical member positioned above the lower helical member has locking mechanism such as locking edges engaging with the linear portion to restrain the rotation of the upper helical member, the lower helical member can rotate and the upper helical member is moved upward by the rotation of the lower helical member.

Figure 13:
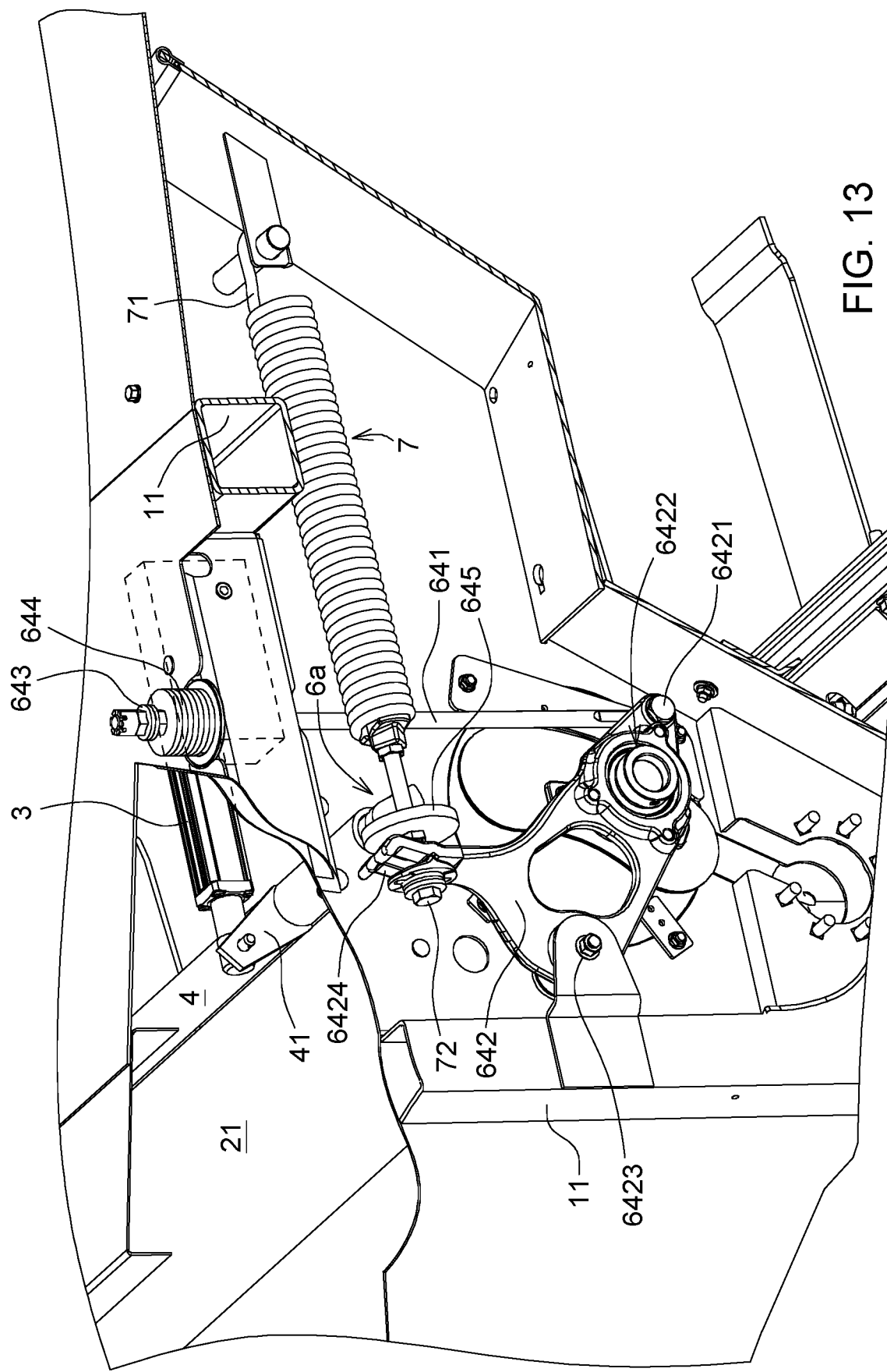
FIG. 13 is a partial right perspective view of a mower-conditioner with an embodiment of an eccentric.
Figure 14:
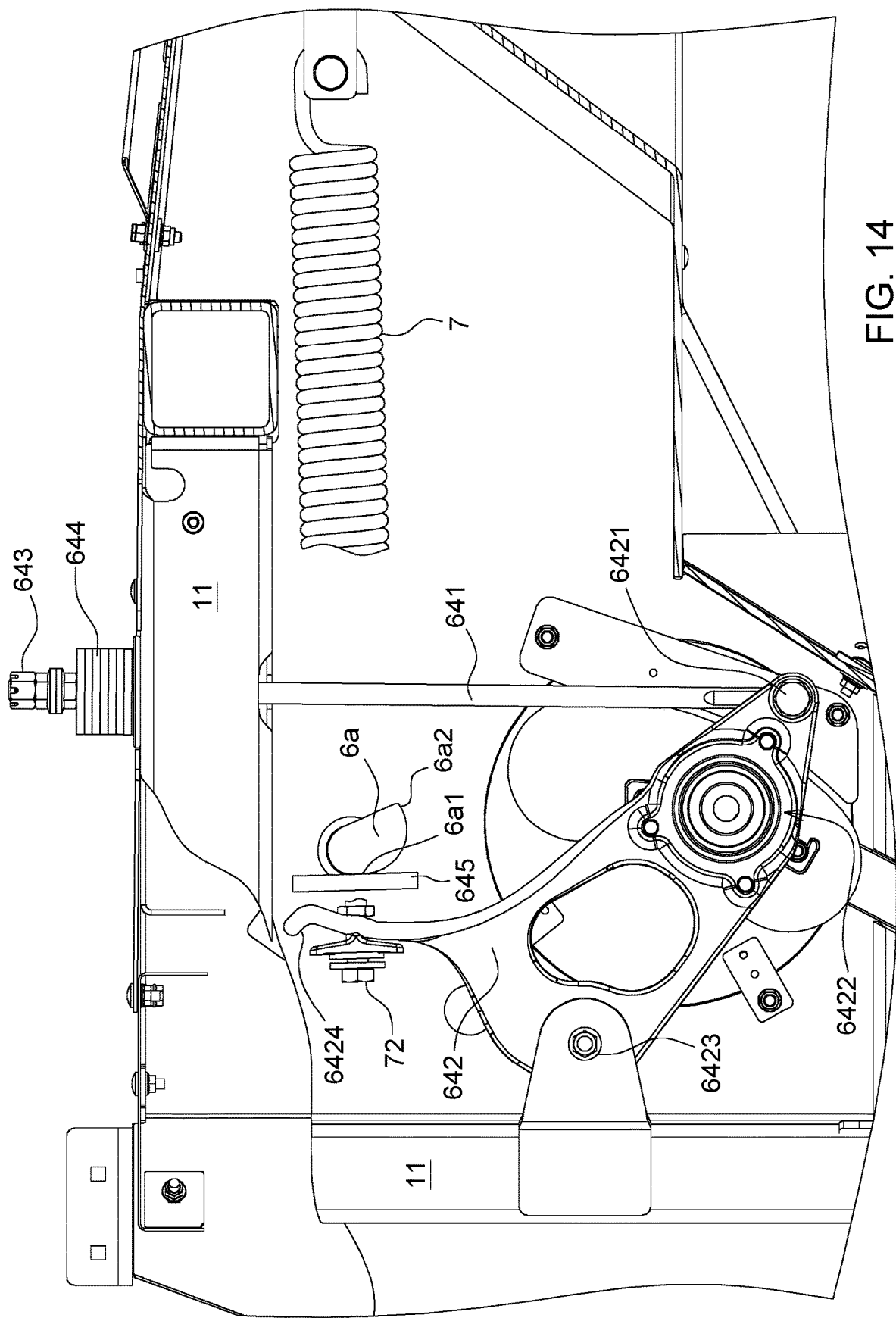
FIG. 14 is a partial right side view of the mower-conditioner of FIG. 13.
Figure 15:
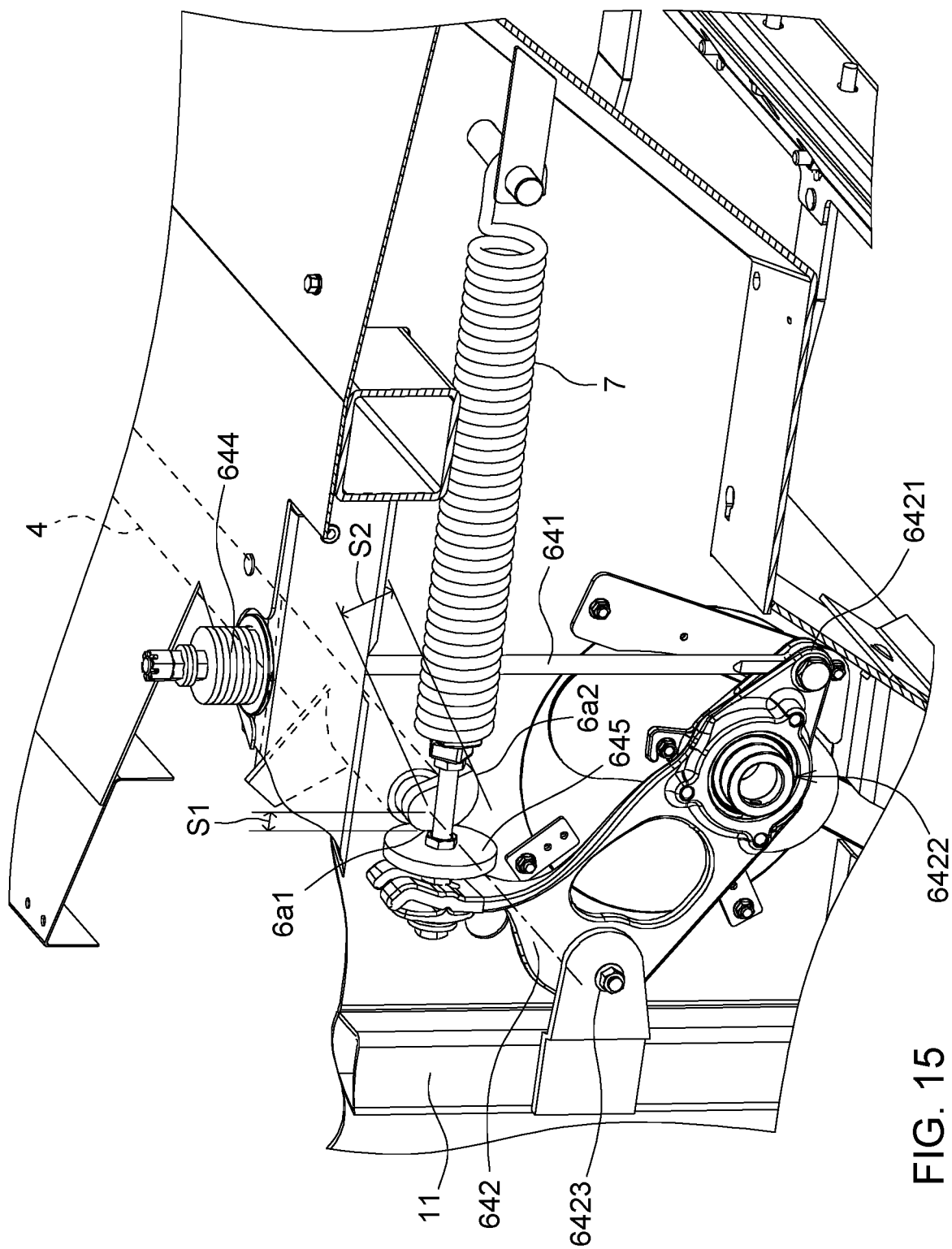
FIG. 15 is a partial right perspective view of a mower-conditioner of FIG. 13.

FIGS. 13-15 illustrate another embodiment of an eccentric assembly for a mower-conditioner. The shaft 4 is rotatable underneath the top sheet of the mower-conditioner. In this embodiment, an eccentric assembly or eccentric 6a is affixed on and rotated with the right end of the shaft 4. It is feasible that there is an eccentric affixed on and rotated with the left end of the shaft 4 but not shown in FIGS. 13-15. In this embodiment, the contour of the eccentric 6a is similar to a half-moon shape but it could be formed in a variety of other shapes. In some embodiment, the eccentric 6a is a cam.

FIG. 14 omits a portion of the resilient unit 7 for the clarity of the eccentric 6a. As seen in FIGS. 14-15, the eccentric 6a includes at least a first contact portion 6a1 and a second contact portion 6a2. A first radial distance S1 is between the first contact portion 6a1 and the axis of the shaft 4; a second radial distance S2 is between the second contact portion 6a2 and the axis of the shaft 4. In this embodiment, the first radial distance S1 is smaller than the second radial distance S2.

The linkage 64 in this embodiment comprises a linear portion 641, a lever 642, a restraining member 643, one or more spacers or washers 644, and a spacer or washer 645. The linear portion 641 is a rod configured to move within the aperture of the frame in a first direction (partially downward) and in a second direction substantially opposite the first direction. The restraining member 643 is used to restrict the movement of the linear portion 641 in a first direction (partially downward) and allows movement of the linear portion 641 in a second direction (partially upward) substantially opposite the first direction.

The lever 642 includes a first connecting portion 6421, a roll carry portion 6422, a pivot portion 6423, and a second connecting portion 6424. The first connecting portion 6421 provides pivotal connection for the bottom of the linear portion 641. The roll carry portion 6422 is coupled to one end of the conditioning roll 21. The pivot portion 6423 is directly coupled to the frame 11 and the lever 642 is configured to rotate about the axis of the pivot portion 6423. The second connecting portion 6424 is coupled to the resilient unit 7. The resilient unit 7 in this embodiment provides a force to minimize the distance between the two conditioning rolls 21 and 22. The resilient unit 7 provides a force biasing the top conditioning roll 21 towards the bottom conditioning roll 22. The spacer 645 is positioned through the left end of the resilient unit 7 and near the second connecting portion 6424. The spacer 645 is positioned between two fasteners in this embodiment and is therefore fixed on part of the resilient unit 7. The embodiment merely shows the spacer 645 located in front of (right at FIGS. 13-15) the connecting portion 6424 but the spacer 645 can be located behind (left at FIGS. 13-15) the connecting portion 6424. Optionally, the spacer 645 is a heavy flat washer.

Referring to FIGS. 13-15, when the shaft 4 rotates clockwise, the eccentric 6a rotates together and contacts/engages the spacer 645 of the linkage 64 from the first contact portion 6a1 to the second contact portion 6a2. Because the first radial distance S1 is smaller than the second radial distance S2, the eccentric 6a pushes against the spacer 645 to move left in a distance equal to the second radial distance S2 minus the first radial distance S1 (S2−S1). Therefore, the lever 642 shown in FIGS. 13-15 rotates counterclockwise and the roll carry portion 6422 moves the conditioning roll 21 partially upward. The linear portion 641 moves partially upward at the same time. On the other hand, if the eccentric 6a contacts/engages the spacer 645 from the second contact portion 6a2 to the first contact portion 6a1, the linear portion 641 moves partially downward. Alternatively, the eccentric 6a can directly contact/engage the second connecting portion 6424 without the spacer 645.

The one or more spacers 644 between the restraining member 643 and the frame may independently adjust the roll gap. The more spacers used, or the thicker the spacers, the more the linear portion 641 moves upward. However, the linear portion 641, restraining member 643, and spacer 644 may be optional for this embodiment.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A mower-conditioner comprising:
   first and second conditioning rolls spaced apart a distance;
   at least one eccentric coupled to the mower-conditioner; and
   a linkage having a lever coupled between the at least one eccentric and the first conditioning roll;
   wherein a rotation of the at least one eccentric about a pivot axis causes the first conditioning roll to move via the lever, which adjusts the distance between the first and second conditioning rolls, the at least one eccentric comprises a first contact portion and a second contact portion, a first radial distance between the first contact portion and the pivot axis is smaller than a second radial distance between the second contact portion and the pivot axis, and the lever rotates based upon a difference between the first and second radial distances when the at least one eccentric rotates about the pivot axis.

2. The mower-conditioner of claim 1, wherein the eccentric is a cam or half-moon shape.

3. The mower-conditioner of claim 1, wherein the lever rotates in response to the rotation of the at least one eccentric around the pivot axis, and the lever adjusts the distance between the first and second conditioning rolls.

4. The mower-conditioner of claim 1, wherein the at least one eccentric configured to move a connecting portion of the lever in a shifting distance equal to the second radial distance minus the first radial distance.

5. The mower-conditioner of claim 4, further comprising a spacer positioned between the at least one eccentric and the connecting portion, wherein the at least one eccentric is configured to push against the spacer to move the connecting portion.

6. The mower-conditioner of claim 1, further comprising a restraining member which restricts movement of the first conditioning roll in a first direction and allows movement of the first conditioning roll in a second direction.

7. The mower-conditioner of claim 6, further comprising a resilient unit coupled to the lever and providing a force to move the first conditioning roll in the first direction.

8. The mower-conditioner of claim 1, further comprising an actuator coupled to the at least one eccentric to cause the rotation of the at least one eccentric.

9. The mower-conditioner of claim 1, further comprising a shaft configured to rotate, wherein the at least one eccentric rotates with the shaft.

10. The mower-conditioner of claim 9, wherein the at least one eccentric is coupled to the shaft and is configured to move the first conditioning roll in a second direction.

11. The mower-conditioner of claim 10, further comprising a resilient unit coupled to the lever and providing a force to move the first conditioning roll in a first direction opposite the second direction.

12. The mower-conditioner of claim 10, wherein the at least one eccentric is affixed on an end of the shaft.

13. A mower-conditioner comprising:
   first and second conditioning rolls spaced apart a distance;
   at least one eccentric coupled to the mower-conditioner; and
   a linkage having a lever coupled between the at least one eccentric and the first conditioning roll;
   wherein a rotation of the at least one eccentric about a pivot axis causes the first conditioning roll to move via the lever, which adjusts the distance between the first and second conditioning rolls, and at least one spacer positioned between the lever and the at least one eccentric and configured to move the lever with the rotation of the at least one eccentric about the pivot axis.

14. The mower-conditioner of claim 13, wherein a number of the at least one spacer or a thickness of the at least one spacer partially determines the distance between the first and second conditioning rolls.

* * * * *